United States Patent
Yao et al.

(10) Patent No.: US 7,276,591 B2
(45) Date of Patent: Oct. 2, 2007

(54) BIOMASS RESIN COMPOSITION, PROCESS FOR PREPARING THE SAME AND MOLDING MATERIAL USING THE BIOMASS COMPOSITION

(75) Inventors: Yaoguang Yao, Shiga-ken (JP); Chuji Kitagawa, Shiga-ken (JP); Motonobu Fujimori, Shiga-ken (JP); Kaoru Fujimori, Shiga-ken (JP)

(73) Assignee: Fuji Carbon Co., Ltd., Shiga-Ken (JP)

( * ) Notice: Subject to any disclaimer, the term of this patent is extended or adjusted under 35 U.S.C. 154(b) by 252 days.

(21) Appl. No.: 10/807,182

(22) Filed: Mar. 24, 2004

(65) Prior Publication Data

US 2005/0027043 A1   Feb. 3, 2005

(30) Foreign Application Priority Data

May 6, 2003   (JP) .............................. 2003-128293

(51) Int. Cl.
- *C07G 1/00* (2006.01)
- *C08L 97/00* (2006.01)
- *C08G 83/00* (2006.01)
- *C08H 5/02* (2006.01)

(52) U.S. Cl. .......................... 530/502; 528/1; 527/103; 527/403

(58) Field of Classification Search ................. 530/500; 528/1; 527/103, 403
See application file for complete search history.

(56) References Cited

U.S. PATENT DOCUMENTS

| | | | | | |
|---|---|---|---|---|---|
| 2,300,307 | A | * | 10/1942 | Novotny et al. | ............ 530/203 |
| 2,319,386 | A | * | 5/1943 | Carmody et al. | ........... 525/133 |
| 3,912,706 | A | * | 10/1975 | Rachor et al. | .............. 527/403 |
| 4,058,403 | A | * | 11/1977 | Funabiki et al. | ............... 501/99 |
| 4,579,892 | A | * | 4/1986 | Calve et al. | ................... 524/14 |
| 5,110,915 | A | * | 5/1992 | Tsujimoto et al. | .......... 530/502 |
| 2005/0020794 | A1 | * | 1/2005 | Shimo et al. | ............... 527/100 |

FOREIGN PATENT DOCUMENTS

| | | |
|---|---|---|
| JP | 61-261358 | 11/1986 |
| JP | 62-79230 | 4/1987 |
| JP | 2-175758 | 7/1990 |
| JP | 3-59035 | 3/1991 |
| JP | 3-126728 | 5/1991 |
| JP | 5-140465 | 6/1993 |
| JP | 6-192357 | 7/1994 |
| JP | 2001-123012 | 5/2001 |
| JP | 2003-104815 | 4/2003 |

OTHER PUBLICATIONS

Office Action; Dispatched No.: 355780; Dispatched date: Aug. 15, 2006; Japanese Patent Application No. 086720/2004.

* cited by examiner

*Primary Examiner*—Nathan M. Nutter
(74) *Attorney, Agent, or Firm*—Antonelli, Terry, Stout & Kraus, LLP.

(57) ABSTRACT

The present invention relates to biomass resin composition comprising a phenolized biomass substance and a reactive substance having a melting point of at most 100° C. other than phenol. The biomass resin composition is prepared by a process, which comprises adding a reactive substance such as a phenol derivative or drying oil into the reaction system, in the step of preparing a phenolized biomass substance by phenolizing a biomass substance with a phenol in the presence of an acid catalyst. The present invention provides a biomass resin composition, in which the melting point can be freely controlled and which is excellent in properties such as flowability, processability, water resistance and impact resistance and can be prepared by a simple process, and a process for preparing the same.

7 Claims, 1 Drawing Sheet

FIG. 1

BIOMASS RESIN COMPOSITION, PROCESS FOR PREPARING THE SAME AND MOLDING MATERIAL USING THE BIOMASS COMPOSITION

BACKGROUND OF THE INVENTION

The present invention relates to a biomass resin composition and a process for preparing the same. Also, the present invention relates to a curable resin composition derived from biomass, a molding material of thermosetting biomass resin and a molded article of thermosetting biomass resin, comprising the biomass resin composition. The curable resin composition derived from biomass of the present invention has a low melting point and favorable moldability and the molded article obtained therefrom is excellent in flexibility, impact strength and water resistance. The curable resin composition is particularly suitable as a binder for various organic and inorganic substrates, varnish for impregnating and resin for molding material.

Phenol resin is inexpensive and has excellent properties such as moldability, mechanical properties, heat resistance, electric insulating properties and chemical resistance. Therefore, phenol resin is widely used industrially, as resin for various molding materials, electric parts, mechanical parts, laminating materials, coating materials, abrasives and friction materials.

Phenol resin is usually prepared from the reaction of a phenol and a formaldehyde in the presence of an acid or an alkali catalyst. In the case of a novolak-type, hexamethylenetetramine is usually used together when curing and by heating, an insoluble and infusible curable resin can be obtained. In the case of a resol-type, curing is usually conducted by heating without a curing agent, as a resol-type resin has self-curing properties. It is known that by reacting a phenol with wood flour instead of a formaldehyde, a resin can be obtained, that can be cured by hexamethylenetetramine in the same manner as novolak-type phenol resin. When preparing this resin, abundantly available scrap wood is used and a formaldehyde does not need to be used. Also, the amount of phenol that is used can be reduced significantly. Therefore, this method is extremely significant in terms of environment and resources. As the reaction method of this process, known are the method of reacting at a high temperature without a catalyst (see for example JP-A-61-261358, JP-A-3-59035 and JP-A-3-126728) and the method of reacting in the presence of an acid catalyst (see for example JP-B-61-2697 and Japanese Patent Application No. 175758/1990).

The method of reacting at a high temperature without a catalyst is unfavorable in terms of facilities, as a pressure-resistant reaction apparatus must be used. Also, the yield of resin of the product is low because thermal decomposition of wood tends to occur during the reaction and also, reactivity as raw material for resin is low. On the other hand, in the method of reacting in the presence of an acid catalyst, solvolysis of the wood and reaction between the wood component and the phenol mainly occur due to action of the catalyst and a resin product having high reactivity can be obtained by introducing a phenol nucleus. Therefore, a great deal of research has been conducted regarding the acid catalyst method.

However, the resin composition obtained by chemical reaction of wood and a phenol (phenolization of wood) (hereinafter also referred to as wood resin) usually has a high melting point of 120 to 150° C., after removing excessive unreacted phenols, and is significantly inferior to the conventional novolak resin (melting point 60 to 110° C.) in view of workability and moldability. Also, in wood resin having a melting point of 120° C. or higher, the melting point is close to the usual temperature of crosslinking reaction by a curing agent (hexamethylenetetramine) and therefore, when mold processing, the crosslinking reaction starts before the resin has sufficient flowability. As a result, the curing reaction tends to be inhomogeneous and defects such as voids and air bubbles are formed inside the molded article. Consequently, the obtained molded article is inferior to commercially available novolak resin, in view of mechanical strength and solvent resistance. Furthermore, because the melting point of wood resin is high, the steps of purifying, transferring, discharging and maintenance of facilities are difficult to conduct when preparing the resin.

Also, due to influence of the hydrophilic properties inherent in biomass such as wood, the obtained wood resin and the cured product have strong water absorbing properties and water resistance of products such as a molded article is poor. Products such as a molded article prepared from phenol/wood resin is more fragile than the conventional synthetic phenol/formaldehyde resin and flexibility and impact strength are low.

In order to lower the melting point of wood resin, suggested is the method of leaving part of the unreacted phenol, which is remnant in the reaction product, in the resin as a plasticizer, after phenolization reaction of wood (see for example JP-A-3-328078). According to this method, the softening point becomes low and properties as resin for molding material improves to an extent. However, the gel time is fast by influence of the unreacted phenol and the effect of improving moldability is limited. Furthermore, unreacted phenol, which is present in the resin in a large amount, is unfavorable from the viewpoint of adverse effects to the health of the workers and to the environment.

JP-A-6-192357 discloses the method of lowering the melting point of wood resin by containing phenol in an extremely large amount of 50 times the wood, when reacting wood and phenol. According to this method, the melting point of wood resin can be lowered to at most 100° C. However, because an extremely large amount of phenol is used for the reaction, the yield of wood resin, which is the product, based on the total amount of reacted matter is low and efficiency of the reaction facilities is poor. Also, a great deal of time and energy is necessary to remove the large amount of unreacted phenol after the reaction and therefore, the wood resin is high in cost and low in practicability. The above methods are effective to a certain degree in lowering the melting point of resin, but cannot improve water resistance and flexibility of wood resin.

Consequently, conventional wood resin has the problems that preparation is difficult, melting point is high and moldability and properties are unsatisfactory, thereby being impractical.

The present invention aims to provide a biomass resin composition, wherein the melting point can be controlled freely and which is excellent in flowability, processability and properties after curing and is prepared by a simple process, and a process for preparing the same. Also, the present invention aims to provide a curable biomass resin composition, a binder, a molding material of thermosetting biomass resin comprising the biomass resin composition and a molded article comprising the binder or the molding material of thermosetting biomass resin.

SUMMARY OF THE INVENTION

Figure 1:
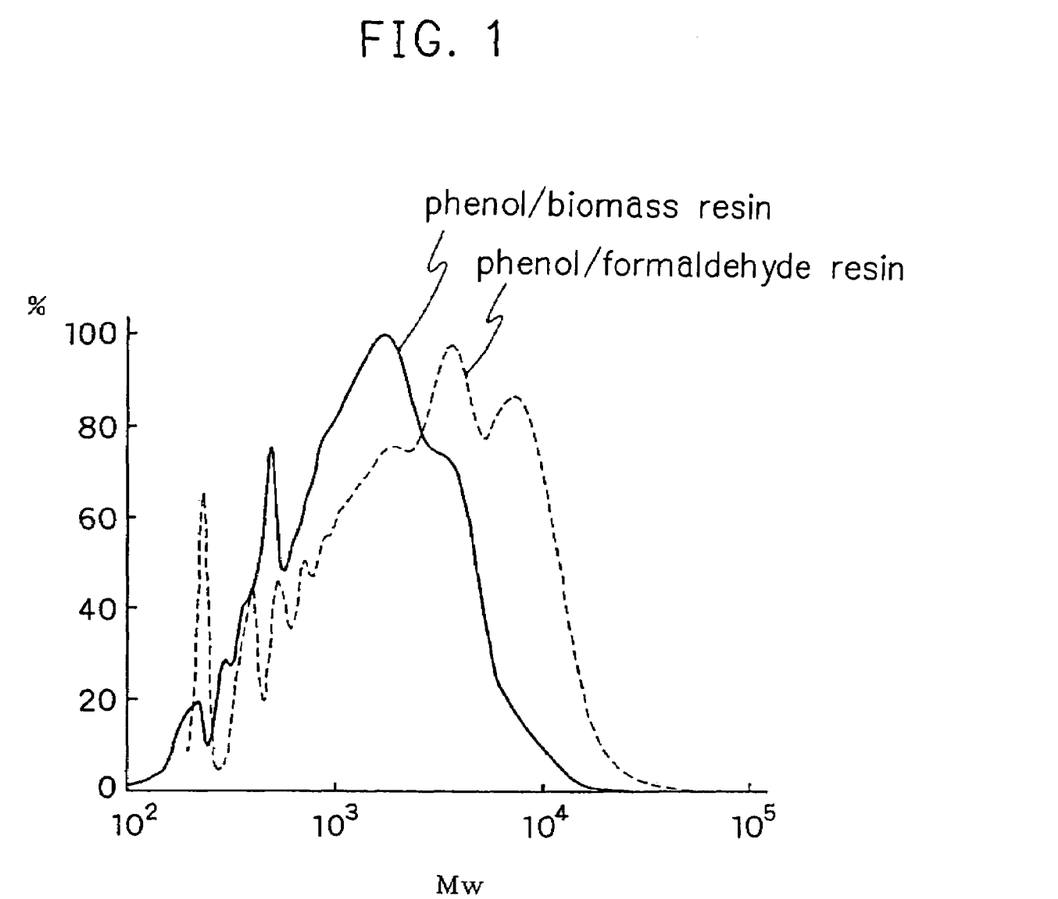
FIG. 1 is a diagram showing a comparison of the molecular weight distribution of conventional phenol/formaldehyde resin and phenol/biomass resin.

In order to solve the above problems, the features of the chemical structures of a reaction product of phenol and raw material of biomass substances such as wood were studied and compared with the chemical structure of the conventional phenol/formaldehyde resin. As a result, phenol/biomass resin was found to have a branched molecular structure, while the conventional novolak phenol/formaldehyde resin mainly has a linear molecular structure. This is because a biomass substance has high reactivity with phenol and many reaction sites and therefore, after being solvolyzed by phenol, the biomass substance reacts further with phenol or another biomass substance component to form a branched structure. Particularly, when the amount of phenol that bonds with the biomass substance increases, the branched structure becomes more complex. As a result, thermal flowability of the phenol/biomass resin decreases further and the molecular structure lacks flexibility. Also, while the conventional phenol/formaldehyde resin contains a certain amount of components having low molecular weight and low melting point, such as a dimer or a trimer, phenol/biomass resin hardly contains such low molecular weight components (see FIG. 1). Carbohydrate, which is a component constituting the biomass substance, contains many hydroxyl groups and is a substance having strong hydrophily. As a result, the biomass resin obtained therefrom also tends to absorb water and is unsatisfactory in water resistance. Due to such features regarding composition and structure of phenol/biomass resin, phenol/biomass resin has an extremely high melting point (see FIG. 1) and is inferior to the conventional phenol resin in view of properties, although the average molecular weight is lower than that of conventional phenol/formaldehyde resin. In this way, as a result of intensive studies regarding the chemical structure and composition of phenol/biomass resin, the object of the present invention has been achieved, by adding a reactive substance having a melting point of at most 100° C. other than phenol, particularly an oily substance that can impart flexibility and hydrophobic properties, to the phenol/biomass resin and by coexisting these reactive substances or a precursor of the reactive substance, in the step of preparing phenol/biomass resin by phenolizing a biomass substance. Thus, the present invention was accomplished.

That is, the present invention relates to a biomass resin composition comprising a phenolized biomass substance and a reactive substance having a melting point of at most 100° C.

The biomass resin composition preferably contains a product obtained by reacting a biomass substance, phenol and a reactive substance having a melting point of at most 100° C., in the presence of an acid catalyst.

The reactive substance is preferably at least one compound selected from the group consisting of phenols, phenol derivatives and condensates of phenol and aldehyde.

The reactive substance is preferably butylphenol, octylphenol, nonylphenol, benzylphenol or benzyl phenyl ether, from the viewpoints of being inexpensive and easily available.

The reactive substance is preferably an oil that contains an aliphatic chain having an unsaturated bond, from the viewpoint that the effect of improving water resistance and flexibility is large.

The reactive substance is preferably drying oil, from the viewpoint of being easily available.

Furthermore, the drying oil is preferably at least one oil selected from the group consisting of wood oil, linseed oil and cashew oil, from the viewpoint that the effect of improving water resistance is large.

The biomass substance is preferably a lignocellulose substance, from the viewpoints of being inexpensive and the properties of the obtained resin composition being excellent.

The amount of said reactive substance is preferably 3 to 50% by weight based on the total biomass resin composition.

The present invention also relates to a process for preparing the biomass resin composition, which comprises adding a reactive substance or a precursor of a reactive substance to the reaction system, in the step of preparing a phenolized biomass substance by phenolizing a biomass substance with a phenol in the presence of an acid catalyst.

In the above process, the precursor of a reactive substance is preferably benzyl alcohol.

In the above process, the amount of the reactive substance is preferably 3 to 50% by weight based on the total biomass resin composition.

In the above process, after reacting a biomass substance, a reactive substance and a phenol in the presence of an acid catalyst, reaction with an aldehyde or an aldehyde derivative is preferably conducted.

The present invention also relates to a curable biomass resin composition comprising at least one substance selected from the group consisting of hexamethylenetetramine, epoxy resin, phenol-resol resin, urea resin, melamine resin, polyamide acid and polyvalent isocyanate; and the above biomass resin composition.

The present invention also relates to a binder comprising the above curable biomass resin composition.

The present invention also relates to a molding material of thermosetting biomass resin comprising the above curable biomass resin composition.

Furthermore, the present invention also relates to a molded article comprising the above binder or the above molding material of thermosetting biomass resin.

TABLE 1

| Resin | Melting point (° C.) | Number average molecular weight (Mn) | Weight average molecular weight (Mw) | Free phenols (%) |
|---|---|---|---|---|
| Phenol/formaldehyde resin | 85 | 962 | 3088 | 0.1 |
| Phenol/biomass resin (Phenolized wood resin) | 126 | 799 | 1755 | 3.2 |

DETAILED DESCRIPTION

The present invention relates to a biomass resin composition containing a phenolized biomass substance and a reactive substance.

In the present invention, a phenolized biomass substance refers to a product obtained by chemically reacting a biomass substance and a phenol and also includes decomposed substances of a biomass substance itself and bonded bodies of a component derived from a biomass substance and a phenol.

The biomass substance that can be used in the present invention is not particularly limited. Examples are lignocellulose substances such as timber, bamboo, kenaf, bagasse and rice straw and derivatives thereof such as wood fiber, wood chips, veneer dust, pulp and paper such as used paper; grains such as rice, wheat and corn, tubers such as a potato and a sweet potato and starch as processed products thereof; and saccharide such as sucrose and glucose. Of these, in view of abundance of the raw material, stability of the quality of the raw material and properties of the produced resin, lignocellulose substances composed mainly of wood are preferable. The form of the biomass substance is not particularly limited, but the biomass substance is preferably pulverized, from the viewpoints of workability and treatment speed.

Examples of the phenols that can be used in the present invention are compounds having a phenolic hydroxyl group such as phenol, cresol, xylenol, bisphenol A, hydroquinone, resorcinol and alkylresorcinol. These may be used alone or two or more kinds may be used in combination. Of these, in view of cost and reactivity, phenol is preferable.

Phenolization reaction of a biomass substance refers to a reaction, wherein the intramolecular bonds of carbonhydrate and lignin, which are the main components of a biomass substance, are split in various degrees and then phenols are introduced into the product. The product obtained therefrom has thermoplasticity and high reactivity. Phenolization reaction of a biomass substance can advance by merely heating a biomass substance and a phenol without a catalyst, but in such a case, an extremely high temperature of 200 to 250° C. is necessary. Also, because thermal decomposition of the biomass substance intensely occurs at the same time as phenolization reaction under such high temperature conditions, the yield of the phenolized biomass substance is low and reactivity of the product is also low. In order to start phenolization reaction of the biomass substance more easily and selectively, the reaction is preferably conducted in the presence of an acid, such as mineral acid including sulfuric acid, hydrochloric acid and phosphoric acid; organic acid including toluenesulfonic acid and phenolsulfonic acid; and Lewis acid including aluminum chloride, zinc chloride and boron trifluoride. Phenolization reaction in the presence of an acid is preferably conducted at a temperature of 100 to 180° C. When the temperature is lower than 100° C., a long period of time is required for phenolization reaction, thereby being impractical. When the temperature is higher than 180° C., thermal decomposition reaction at a high temperature of the biomass substance becomes intense and reactivity, along with yield of the reaction product, tends to decrease.

In phenolization reaction of the biomass substance, phenols are preferably used in an amount of 0.5 to 10 times, more preferably 1 to 5 times, further preferably 1.5 to 4 times, in weight ratio based on the biomass substance. When the amount is less than 0.5 time, the biomass substance cannot be sufficiently phenolized and thermoplasticity and reactivity tend to become insufficient. When the amount is more than 10 times, reaction can be conducted without any problems, but the yield of the produced phenolized biomass substance becomes poor, thereby being unfavorable in view of operational efficiency.

When phenolization reaction is conducted in the presence of an acid catalyst, the acid catalyst is preferably used in an amount of 0.1 to 20 parts by weight, more preferably 0.2 to 10 parts by weight, further preferably 0.5 to 5 parts by weight, based on 100 parts by weight of the biomass substance. When the amount of the acid catalyst is less than 0.1 part by weight, the catalytic effect is not sufficiently obtained and thermoplasticity and reactivity of the reaction product tend to become insufficient. When the amount of the acid catalyst is more than 20 parts by weight, the molecular weight of the biomass substance becomes high and crosslinking reaction occurs and as a result, thermal flowability tends to decrease.

The reaction time of phenolization reaction of the biomass substance is not particularly limited and can be conducted within the range of 10 to 300 minutes, depending on the desired reaction ratio of the biomass substance and flowability and reactivity of the phenolized biomass substance.

In phenolization reaction of the biomass substance, the biomass substance does not necessarily need to be reacted 100% and unreacted biomass substance may remain in the biomass resin composition as unreacted residue. The amount of unreacted residue is measured by dissolving the obtained biomass resin composition in methanol after the reaction, separating the insoluble content by filtration, then drying and accurately weighing the insoluble content. The unreacted residue usually does not need to separated from the biomass resin composition and can be used as a filler. However, in order to increase the ratio of resin in the reacted product and the flowability of the biomass resin composition, phenolization reaction is conducted until the amount of unreacted residue in the biomass resin composition is preferably at most 20%, more preferably at most 10%, further preferably at most 5%.

In the present invention, the reactive substance contained in the biomass resin composition reacts with the components in the resin composition, such as the biomass substance, the phenolized biomass substance and phenol, or with the curing agent that is added in order to cure the biomass resin composition, during the step of preparing the biomass resin composition or when curing the biomass resin composition, and then is introduced into the polymer network. The reactive substance is preferably a substance other than phenol having a melting point of at most 100° C. When a substance having a melting point higher than 100° C. is used, the melting point of the biomass resin composition is high, moldability is insufficient and properties tend to decrease. Also, when phenol is used as the reactive substance, in the case that the biomass resin composition is cured using hexamethylenetetramine, phenol, which is acidic, accelerates decomposition of hexamethylenetetramine which is a curing agent, thereby increasing the curing reaction rate of the biomass resin composition as a whole. As a result, moldability of the biomass resin composition decreases. Furthermore, phenol is unfavorable, in that the operation environment is adversely affected when a large amount of phenol is present in the resin. Examples of the reactive substance having a melting point of at most 100° C. and reactivity other than phenol are not particularly limited, but when considering the processes for preparing and curing the biomass resin composition, compounds having a phenolic hydroxyl group, derivatives thereof and oily matter having an aliphatic unsaturated bond can be used. Examples are substituted phenols such as o-t-butylphenol, p-t-butylphenol, m-t-butylphenol, 2,4-di-t-butylphenol, 2,6-di-t-butylphenol, 3,5-di-t-butylphenol, p-t-octylphenol, p-nonylphenol, 2-benzylphenol, 4-benzylphenol, o-phenylphenol and 3-methoxyphenol; phenol derivatives such as benzylphenyl ether and diphenyl ether; condensates having a melting point of at most 100° C. obtained by reacting phenols and formaldehydes under acidic or alkali conditions; compounds having a melting point of at most 100° C. containing one or at least two epoxy groups; natural drying oils such as wood oil, linseed oil, cashew oil, soyabean oil, rapeseed oil and dehydrated castor oil; and synthetic oils containing an aliphatic unsaturated bond. Of these, butylphenol, octylphenol, nonylphenol, benzylphenol and benzyl phenyl ether are preferable, from the viewpoint that the effects of lowering the melting point and improving moldability of the biomass resin composition are large. Also, natural drying oils such as wood oil, linseed oil and cashew oil not only lower the melting point of the biomass resin composition and improve moldability, but are also effective in improving water resistance, flexibility and impact strength of biomass resin and therefore are particularly preferable. The reactive substance may be used alone or in a combination of two or more kinds.

The method for obtaining the biomass resin composition by mixing or reacting the phenolized biomass substance and the reactive substance is not particularly limited and can be selected according to the mode of action of the reactive substance. For example, substituted phenols such as p-t-butylphenol, m-t-butylphenol, 2-benzylphenol and 3-methoxyphenol; phenol derivatives such as benzylphenyl ether and diphenyl ether; condensates having a melting point of at most 100° C. obtained by reacting phenols and formaldehydes under acidic or alkali conditions and compounds having a melting point of at most 100° C. containing one or at least two epoxy groups have a certain action and effect without reacting with the biomass substance. Therefore, the reactive substance can be added into the reaction system before, during or after phenolization reaction of the biomass substance or the reactive substance can be mixed with the phenolized biomass substance after phenolization reaction. Usually, the phenolized biomass substance and the reactive substance are preferably melted and mixed. Consequently, the reactive substance is preferably added into the reaction system before, during or after phenolization reaction of the biomass substance, from the viewpoint that melting and mixing can be easily conducted. Also, from the viewpoints that the obtained melted mixture has a low melting point and handling such as discharging can be easily conducted, the reactive substance is preferably added into the reaction system before, during or after phenolization reaction of the biomass substance. Furthermore, the reactive substance is more preferably added before the reaction, from the viewpoints that due to the diluting action of the reactive substance that is added, viscosity of the reaction system decreases and phenolization reaction of the biomass substance progresses more easily, to obtain a more homogeneous product, and due to the diluting action and involvement with the reaction system of the reactive substance, the reaction degree of the phenol and the biomass substance decreases and the molecular structure becomes more linear, thereby lowering the melting point of the phenolized biomass substance even further.

Additionally, in the case that the reactive substance is drying oil, when the drying oil is added after phenolization reaction of the biomass, the effect of improving properties such as water resistance and flexibility may not be obtained. This is because the drying oil and the biomass or the phenolized biomass component do not chemically react and phase separation of the drying oil and the phenolized biomass occurs, as the drying oil has low compatibility with the biomass component. In order to obtain the effect of modifying by drying oil, the drying oil and the biomass and/or the phenolized biomass must be chemically reacted. Consequently, the drying oil is preferably added before or during the reaction. Also, reaction of the drying oil and the biomass and/or the phenolized biomass is preferably conducted at 60 to 180° C., more preferably 80 to 160° C., under acidic conditions. The reaction time is not particularly limited and is preferably 30 to 180 minutes.

Phenolization reaction of biomass such as wood is usually conducted in the presence of strong acid such as sulfuric acid and phenolsulfonic acid under a temperature of at most 100° C. Therefore, modification by drying oil can be directly conducted concurrently with phenolization of biomass under the same conditions. Also, drying oil and phenol can be reacted in advance and then, biomass can be added, to subsequently conduct phenolization.

The reactive substance can be produced by directly phenolizing a precursor of the reactive substance and a phenol in the phenolization reaction system of the biomass substance. When the precursor of the reactive substance is added into the reaction system when preparing the phenolized biomass substance, the precursor of the reactive substance and the phenols present in the reaction system react to produce the reactive substance. Therefore, when using a precursor of the reactive substance, the reactive substance does not need to be added and also, the precursor of the reactive substance and the reactive substance can be used together. Adding a precursor of the reactive substance is preferable in view of production cost, as a precursor of the reactive substance is less expensive and the amount that is added can be smaller than in the case of the reactive substance. Also, adding a precursor of the reactive substance is also preferable in view of operational convenience, as the step of separately producing the reactive substance can be omitted. As the precursor of the reactive substance, a substance that can react with a phenol and produce a reactive substance having a melting point of at most 100° C. can be used. The precursor of the reactive substance is not particularly limited. Examples are benzyl alcohols such as benzyl alcohol, 2,4-dimethoxybenzyl alcohol, 3,4-dimethoxybenzyl alcohol, 3,5-dimethoxybenzyl alcohol, 2,5-dimethoxybenzyl alcohol, m-hydroxybenzyl alcohol, p-hydroxybenzyl alcohol, p-methylbenzyl alcohol and m-nitrobenzyl alcohol and derivatives thereof. Of these, benzyl alcohol, which is inexpensive and industrially easy to obtain, is particularly suitable. Benzyl alcohol has lower reactivity with a biomass substance than phenol. Therefore, for example, when benzyl alcohol is used as the precursor of the reactive substance, although the amount that reacts directly with the biomass substance is small, benzyl alcohol quickly reacts with the phenol that is present in the system, in the presence of an acid catalyst, and is converted into 2-benzylphenol (melting point 54° C.), 4-benzylphenol (melting point 83° C.) and benzyl phenyl ether (melting point 39° C.).

The time for adding the precursor of the reactive substance is not particularly limited and the precursor of the reactive substance can be added before, during or after phenolization reaction of the biomass substance. The effect can be obtained in the case that the precursor of the reactive substance and phenol in the reaction system can be reacted. However, in order to further obtain the effect of lowering the softening point, the precursor of the reactive substance is preferably added before phenolization reaction of the biomass substance. By adding the precursor of the reactive substance before the reaction, the effect of increasing the amount of solvent and the effect of decreasing viscosity by the precursor of the reactive substance can be obtained. Consequently, reaction homogeneity of the biomass substance increases and bonds between the biomass substance and phenol decrease by action of the precursor of the reactive substance. As a result, a favorable phenolized product having a lower melting point is obtained.

The amount of the reactive substance is preferably within the range of 3 to 50% by weight, more preferably within the range of 5 to 40% by weight, based on the total weight of the biomass resin composition. When the amount is less than 3% by weight, the amount of the reactive substance is small and the modification effect cannot be sufficiently obtained. When the amount of the reactive substance is more than 50% by weight, reactivity and properties of the resin tend to decrease.

In the present invention, usually unreacted free phenols are present in the reaction system after preparing the biomass resin composition. When a large amount of free phenol is present, moldability and properties of the resin decrease and so free phenol is preferably removed. The process for removing free phenol is not particularly limited. The free phenol can be removed by methods such as washing with water, solvent extraction, steam distillation and vacuum distillation. Vacuum distillation is preferable in view of workability and cost. Vacuum distillation can usually be conducted under the conditions of temperature of 120 to 200° C. and pressure of 20 to 100 mmHg ($2.6 \times 10^{-3}$ to $1.3 \times 10^{-2}$ MPa). The amount of free phenol in the biomass resin composition after purification by vacuum distillation is not particularly limited, but is preferably at most 5%, more preferably at most 2%.

In the present invention, after reaction of the biomass substance, the reactive substance and phenol, aldehyde or an aldehyde derivative can be added to the reaction system without removing unreacted free phenol and reaction can be continued under acidic or alkali conditions. By adding aldehyde or an aldehyde derivative to the obtained reaction product, after reaction of the biomass substance, the reactive substance and phenols, a phenol nucleus can be introduced or a methylol group can be introduced (methylolization). Aldehyde or the aldehyde derivative that is added is not particularly limited. Examples of aldehyde are paraformaldehyde, formalin and furfural and an example of the aldehyde derivative is hexamethylenetetramine. Aldehyde or the aldehyde derivative is preferably added in an amount of at most 1 in molar ratio, based on the amount of free phenols in the reaction system, under acidic reaction conditions. When the molar ratio is more than 1, the reacted substance tends to quickly become high in molecular weight or to gelate. Under alkali conditions, aldehyde or the aldehyde derivative is preferably added in an amount of 1.0 to 4.0 in molar ratio. When the molar ratio is less than 1.0, methylol groups are insufficient and curing reactivity tends to become insufficient. When the molar ratio is more than 4.0, aldehyde tends to remain in the reacted substance in a large amount. The biomass resin composition methylolized by this method is usually a liquid and can be used for an adhesive and varnish for impregnating. The reaction temperature when aldehyde or an aldehyde derivative is added and reaction is continued is not particularly limited. The temperature is preferably within the range of 60 to 150° C., but when rapid exothermic reaction may occur, the reaction temperature is more preferably set to 60 to 100° C. The reaction time is not particularly limited and is usually 0 to 180 minutes.

The melting point of the biomass resin composition of the present invention obtained by the above preparation process (excluding those subjected to methylolization) can be controlled within the range 60 to 120° C. by adjusting the type and/or the amount of the reactive substance. The biomass resin composition of the present invention is excellent in properties such as flowability, moldability, resin strength after curing, heat resistance and solvent resistance. Furthermore, by using drying oil as the reactive substance, water resistance and flexibility of the obtained biomass resin can be improved at the same time.

The biomass resin composition of the present invention can be used as a curable biomass resin composition or a biomass molding material.

Except for the composition methylolized under alkali conditions by adding an aldehyde, the biomass resin composition of the present invention is thermoplastic and by adding a crosslinking agent (or a crosslinking resin) as a curing agent, can be used as a curable biomass resin composition. As the curing agent, one member or at least two members selected from the group consisting of hexamethylenetetramine, epoxy resin, phenol-resol resin, urea resin, melamine resin, polyamide acid and polyvalent isocyanate can be used. Of these, hexamethylenetetramine is preferable from the viewpoints of high-speed reactivity, low cost and that the added amount can be small. The amount of the curing agent differs according to the type of the curing agent and can be the amount that is usually used in each curing system. For example, when hexamethylenetetramine is used as the curing agent, 5 to 25 parts by weight are preferably added based on 100 parts by weight of the biomass resin composition. When the amount is less than 5 parts by weight, curing is incomplete and favorable properties may not be obtained. When the amount is more than 25 parts by weight, a large amount of gas is generated during the curing reaction and defects appear in the cured object. Also, in the same way, favorable properties may not be obtained. When crosslinking is conducted with epoxy resin or polyvalent isocyanate, 0.5 to 2.0 equivalents are preferably added based on one equivalent of the hydroxyl group of the biomass resin composition. When the amount is less than 0.5 equivalent or more than 2.0 equivalent, in both cases, curing is incomplete and favorable curing properties may not be obtained. When phenol-resol resin, urea resin, melamine resin or polyamide acid is used as the curing agent, 30 to 300 parts by weight are preferably added based on 100 parts by weight of the biomass resin composition. When the amount is less than 30 parts by weight and more than 300 parts by weight, in both cases, curing is incomplete and favorable properties may not be obtained.

To the curable biomass resin composition, various curing accelerators can be added. The curing accelerator is not particularly limited and all of those that are usually used in each curing system can be used. For example, in a curable biomass resin composition/hexamethylenetetramine system, oxides or hydroxides of earth metals such as calcium oxide, magnesium oxide and calcium hydroxide; adducts of phenols such as resorcinol and hexamethylenetetramine; sodium tetraborate; dicarboxylic acid and various amine compounds can be used. In a curable biomass resin composition/epoxy resin system, diazabicycloalkene and derivatives thereof; ternary amines such as triethylenediamine; imidazoles such as 2-methylimidazole and organic phosphines such as tributylphosphine can be used. The curing temperature is not particularly limited and except for when polyvalent isocyanate is used, is preferably within the range of 120 to 300° C. When polyvalent isocyanate is used, a temperature within the range of room temperature to 120° C. is preferable.

By heating, the curable biomass resin composition of the present invention becomes a three-dimensional cured object having excellent strength, heat resistance and solvent resistance. Therefore, the curable biomass resin composition is useful as various organic and inorganic binders such as a shell mold, a grinding stone, a refractory material and a friction material and as resin for molding material of mechanical, automobile, electric, electronic and telecommunication equipment parts.

The curable biomass resin composition of the present invention can be used in various industries as a binder to all substrates and auxiliary materials conventionally used depending on the use. A compound of the curable biomass resin composition, wherein the curable biomass resin composition is compounded in a substrate or an auxiliary material, can be used in various industries as a molded article after molding.

Examples of the substrate or auxiliary material are molding sand such as silica sand for shell molds; various abrasive grains, fillers and cloth for abrasives; rock wool, Kevlar fiber, glass fiber and inorganic fillers for friction materials; electrofused substances such as electrofused alumina and electrofused magnesia, baked substances such as baked magnesia, various metal oxides, carbides and graphite for refractories; and rock wool, glass fiber, inorganic fillers, inorganic lightweight aggregate, wood chips, pulp and organic fiber for various molded articles such as building and interior material. To the compound of the curable biomass resin composition, a curing accelerator, a release agent and a coloring agent can be added when necessary. In this way, when using as a binder, the curable biomass resin composition is usually compounded in an amount of 1 to 30 parts by weight, preferably 2 to 20 parts by weight, based on 100 parts by weight of the substrate or the auxiliary material.

The mixing order and mixing method of the substrate or the auxiliary material and the curable biomass resin composition is not particularly limited and conventionally known methods of each use can be used. Examples are the method of mixing at room temperature with a mixer, the method of heat mixing, the methods of coating, spraying or applying a solution obtained by dissolving the biomass resin composition in a solvent to the substrate or the auxiliary material and the method of immersing the substrate or the auxiliary material in the above solution.

The method for molding the compound of the curable biomass resin composition is not particularly limited and all conventionally known methods can be used. Examples are thermocompression molding, bake molding and heat molding. The molding temperature differs according to the use, but is usually 120 to 300° C. When preparing a refractory material, carbonization can be conducted at 1200° C.

When using the curable biomass resin composition of the present invention for molding material of thermosetting resin, besides the biomass resin composition and the curing agent, a curing accelerator, an inorganic filler or an organic filler can be added when necessary. By adding a filler, strength and dimensional stability of the obtained molded article can be improved further. As the filler, various organic fillers or inorganic fillers that can be used in plastic material as a filler or a reinforcing agent can be used. Examples are reinforcing fibers such as wood flour, cellulose, wood pulp, glass fiber, carbon fiber, phosphar fiber and boron fiber; hydrated metal oxides such as aluminum hydroxide and magnesium hydroxide; metal carbonates such as magnesium carbonate and calcium carbonate; metal borates such as magnesium borate; and inorganic fillers such as silica, carbon black, mica and fused silica. The amount of the filler is not particularly limited and for example, is usually 20 to 2000 parts by weight, preferably 30 to 1000 parts by weight, more preferably 50 to 500 parts by weight, based on 100 parts by weight of the resin component (curable resin composition) obtained by adding the curing agent to the biomass resin composition. Also, to the molding material of curable biomass resin, additives can be added when necessary. Examples are inner release agents such as silicone and waxes, a coupling agent, a flame retardant, a photostabilizer, an antioxidant, a pigment and an extending agent.

The molding material of thermosetting biomass resin of the present invention is prepared by mixing the biomass resin composition, a curing agent, and when necessary, a curing accelerator, a filler and various additives, and is applied for preparation of a molded article. In the present invention, the mixing order of the biomass resin composition and optional components such as a curing agent is not particularly limited. For example, the biomass resin composition and a curing agent can be thoroughly mixed and then, when necessary, a filler and other additives can be added and mixed to prepare powder or granular molding material (compound).

Specifically, for example, the compound can be prepared by the following procedures. First, the biomass resin composition and hexamethylenetetramine are pulverized and mixed at room temperature using a mixer. Then, additives such as a curing accelerator and a release agent are added to the mixture and mixed and furthermore, a filler is added and mixed. Thereafter, the mixture is heated and kneaded using a heat roller or a twin-screw extruder set to 80 to 100° C. and pulverized when cooled to room temperature, to obtain the compound. The filler and other additives do not need to be added after mixing the biomass resin composition and the curing agent and can be conducted any time. Also, the method of only mixing at room temperature without heating and kneading and the method of wet mixing each component in a solvent such as methanol using a mixer and then drying after mixing can be used.

The molding material of thermosetting biomass resin of the present invention can be made into a molded article by various conventionally known methods for molding resin. Examples of such methods for molding resin are compression molding, injection molding, extrusion molding, transfer molding and cast molding. More specifically, when preparing a molded article by transfer molding using the molding material of biomass resin of the present invention, the molded article can be prepared under molding conditions of a temperature of 120 to 200° C., injection pressure of 5 to 300 kgf/cm$^2$ (0.49 to 29.4 MPa), preferably 20 to 300 kgf/cm$^2$ (1.96 to 29.4 MPa), mold clamping pressure of 50 to 250 kgf/cm$^2$ (4.9 to 24.5 MPa) and time of 1 to 10 minutes.

The molded article obtained from the molding material of thermosetting biomass resin is used for mechanical, automobile, electric, electronic and telecommunication equipment parts, building material such as various organic and inorganic boards and miscellaneous goods such as synthetic lacquer ware.

Hereinafter, the present invention is explained in detail by means of Examples, but the present invention is not limited thereto.

EXAMPLE 1

A separable flask equipped with a stirrer, a thermometer, a reflux condenser and a charging mouth was charged first with 100 parts by weight of dried Douglas fir wood flour. Then, 300 parts by weight of phenol containing 1% by weight of sulfuric acid was added and thereafter 20 parts by weight of benzyl alcohol was added. After adding, reaction was conducted while stirring at 145 to 150° C. under reflux for 2 hours. Then, the mixture was neutralized by magnesium oxide and unreacted phenol was removed under reduced pressure at a temperature of at most 160° C., to obtain 220 parts by weight of a wood flour resin composition containing 0.2% of free phenol and having a softening point of 94.6° C. The amount of unliquefied wood flour residue was 1.2%.

EXAMPLE 2

215 parts by weight of a wood flour resin composition was obtained under the same conditions as in Example 1, except that the amount of phenol containing 1% by weight of sulfuric acid was 250 parts by weight and the amount of benzyl alcohol was 25 parts by weight, based on 100 parts by weight of dried Douglas fir wood flour. The analysis results of the wood flour resin composition are shown in Table 2.

EXAMPLE 3

100 parts by weight dry waste paper for office use (torn by a shredder) was used as the biomass susbtance instead of wood flour. Then, after 300 parts by weight of phenol containing 2% by weight of sulfuric acid and 20 parts by weight of benzyl alcohol were added, 240 parts by weight of a waste paper resin composition was obtained by the same conditions as in Example 1. The analysis results of the waste paper resin composition are shown in Table 2.

EXAMPLE 4

Phenolization reaction of wood flour was conducted at 145 to 150° C. under reflux for 2 hours under the same conditions as in Example 1, except that benzyl alcohol, which is a precursor of the reactive susbtance, was not added for phenolization reaction of the dried Douglas fir wood flour. Then, 20 parts by weight of benzyl alcohol was added and reaction was conducted further for 20 minutes at the same temperature. Then, the mixture was neutralized by magnesium oxide and unreacted phenol was removed under reduced pressure at a temperature of at most 160° C., to obtain 265 parts by weight of a wood resin composition. The analysis results of the wood flour resin composition are shown in Table 2.

EXAMPLE 5

A separable flask equipped with a stirrer, a thermometer, a reflux condenser and a charging mouth was charged first with 100 parts by weight of dried Douglas fir wood flour. Then, 300 parts by weight of phenol containing 1% by weight of sulfuric acid was added and thereafter 35 parts by weight of p-t-butylphenol was added. After adding, reaction was conducted while stirring at 145 to 150° C. under reflux for 2 hours. Then, the mixture was neutralized by magnesium oxide and unreacted phenol was removed under reduced pressure at a temperature of at most 160° C., to obtain 235 parts by weight of a wood flour resin composition. The analysis results of the wood flour resin composition are shown in Table 2.

EXAMPLE 6

A separable flask equipped with a stirrer, a thermometer, a reflux condenser and a charging mouth was charged first with 100 parts by weight of dried Douglas fir wood flour. Then, 300 parts by weight of phenol containing 1% by weight of sulfuric acid was added. After adding, reaction was conducted while stirring at 145 to 150° C. under reflux for 2 hours. Then, after the mixture was neutralized by magnesium oxide, 35 parts by weight of p-nonylphenol was added and dissolved by thoroughly stirring. Thereafter, unreacted phenol was removed under reduced pressure at a temperature of at most 160° C., to obtain 260 parts by weight of a wood flour resin composition. The analysis results of the wood flour resin composition are shown in Table 2.

EXAMPLE 7

A separable flask equipped with a stirrer, a thermometer, a reflux condenser and a charging mouth was charged first with 100 parts by weight of dried Douglas fir wood flour. Then, 300 parts by weight of phenol containing 1% by weight of sulfuric acid was added. After adding, reaction was conducted while stirring at 145 to 150° C. under reflux for 1 hour. Thereafter, 100 parts by weight of wood oil (available from Nacalai Tesque, Inc.) was added and reaction was conducted further for 60 minutes at the same temperature. Then, after the mixture was neutralized by magnesium oxide, unreacted phenol was removed under reduced pressure at a temperature of at most 160° C., to obtain 336 parts by weight of a wood resin composition. The analysis results of the wood flour resin composition are shown in Table 2.

EXAMPLE 8

284 parts by weight of a wood resin composition modified by wood oil was obtained under the same conditions as in Example 7, except that the amount of wood oil was 50 parts by weight. The analysis results of the wood flour resin composition are shown in Table 2.

EXAMPLES 9 to 11

Wood resin modified by linseed oil, wood resin modified by cashew oil and wood resin modified by soyabean oil were obtained by the same conditions as in Example 8, except that linseed oil (available from Nacalai Tesque, Inc.), cashew oil (available from Cashew Co. Ltd.) and soyabean oil (available from Nacalai Tesque, Inc.) were respectively used instead of wood oil. The analysis results of each wood flour resin composition are shown in Table 2.

EXAMPLE 12

A separable flask equipped with a stirrer, a thermometer, a reflux condenser and a charging mouth was charged first with 100 parts by weight of dried Douglas fir wood flour. Then, 300 parts by weight of phenol containing 1% by weight of sulfuric acid was added and thereafter 20 parts by weight of benzyl alcohol was added. After adding, reaction was conducted while stirring at 145 to 150° C. under reflux for 1 hour. Thereafter, 100 parts by weight of wood oil was added and reaction was conducted further for 60 minutes at the same temperature. Then, the mixture was neutralized by magnesium oxide and unreacted phenol was removed under reduced pressure at a temperature of at most 160° C., to obtain 331 parts by weight of a wood resin composition. The analysis results of the wood flour resin composition are shown in Table 2.

EXAMPLE 13

A separable flask equipped with a stirrer, a thermometer, a reflux condenser and a charging mouth was charged first with 100 parts by weight of dried Douglas fir wood flour. Then, 300 parts by weight of phenol containing 1% by weight of sulfuric acid was added and thereafter 20 parts by weight of benzyl alcohol was added. After adding, reaction was conducted while stirring at 145 to 150° C. under reflux for 2 hours. Then, the temperature of the reacted substance was lowered to 90° C. and a small amount of the reacted substance was sampled and measured by HPLC, thereby finding that 172 parts by weight of unreacted phenol was contained. 89 parts by weight of formalin (0.6 mol based on phenol) was dropped over 20 minutes under reflux. Thereafter, reaction was conducted further at 90° C. for 30 minutes and after neutralizing by magnesium oxide, unreacted phenol was removed under reduced pressure at a temperature of at most 160° C., to obtain 300 parts by weight of a wood flour resin composition. The analysis results of the wood flour resin composition are shown in Table 2.

EXAMPLE 14

A separable flask equipped with a stirrer, a thermometer, a reflux condenser and a charging mouth was charged first with 100 parts by weight of dried Douglas fir wood flour. Then, 200 parts by weight of phenol containing 1% by weight of sulfuric acid was added and thereafter 100 parts by weight of wood oil was added. After adding, reaction was conducted while stirring at 145 to 150° C. under reflux for 2 hours. Then, the temperature of the reacted substance was lowered to 60° C. and a small amount of the reacted substance was sampled and measured by HPLC, thereby finding 89 parts by weight of unreacted phenol was contained. Subsequently, 9.4 parts by weight of 50% sodium hydroxide and 100 parts by weight of water were added to the above reacted substance and 162 parts by weight (2.0 mol based on free phenol) of 35% formalin was dropped over 20 minutes under reflux at 60° C. Thereafter, reaction was conducted further at 60° C. for 180 minutes and 670 parts by weight of a resol-type wood resin solution was obtained. Nonvolatile content of the obtained resin was 63%, viscosity at 25° C. was 1900 CP and gel time at 150° C. was 82 seconds. The obtained resin was stable even when stored at room temperature for 1 month.

COMPARATIVE EXAMPLE 1

A separable flask equipped with a stirrer, a thermometer, a reflux condenser and a charging mouth was charged first with 100 parts by weight of dried Douglas fir wood flour and then 300 parts by weight of phenol containing 1% by weight of sulfuric acid was added. After adding, reaction was conducted while stirring at 145 to 150° C. under reflux for 2 hours. Then, the mixture was neutralized by magnesium oxide and unreacted phenol was removed under reduced pressure at a temperature of at most 160° C., to obtain 230 parts by weight of a wood flour resin composition containing 3.2% of free phenol and having a softening point of 126.3° C. The amount of unliquefied wood flour residue was 1.3%.

COMPARATIVE EXAMPLE 2

100 parts by weight dry waste paper for office use (torn by a shredder) was used as the biomass substance instead of wood flour. Then, after 300 parts by weight of phenol containing 2% by weight of sulfuric acid was added, 220 parts by weight of a waste paper resin composition containing 2.1% of free phenol and having a softening point of 132.4° C. was obtained by the same conditions as in Comparative Example 1. The amount of unliquefied residue was 7.1% (including filler component of the waste paper).

EXAMPLES 15 to 27

15 parts by weight of hexamethylenetetramine was added to 100 parts by weight of the biomass resins obtained in Examples 1 to 13 and then pulverization and mixing were conducted at room temperature for 10 minutes using a vibrating ball mill (MB-3, made by Chuo Kakohki Co., Ltd.), to obtain a curable biomass resin composition. Flowability of the obtained curable biomass resin composition was measured according to JIS K6910-1999 and the results are shown in Table 2. 4 parts by weight of calcium hydroxide as a curing accelerator and 2 parts by weight of zinc stearate as a lubricant were added to 100 parts by weight of the obtained mixture and then mixed and thereafter, 100 parts by weight of wood flour (Cellulosin No. 100, available from Casino Co. Ltd.) as a filler was added and mixed. After the obtained mixture was kneaded at 100° C. at a rate of 60 rpm using a L/D=24 twin-screw kneader (made by Toshiba Machine Co., Ltd.), the mixture was cooled to room temperature to obtain a compound for molding (molding material) pulverized by a power mill. The moldability (disc flow) of the obtained molding material was measured according to JIS K6911-1995 and the results are shown in Table 3. A molded article (specimen, 4 mm×10 mm×100 mm) for a flexural test according to JIS K6911-1995 was prepared by molding the obtained compound while applying heat and pressure at 175° C. under 300 kgf/cm² (29.4 MPa) for 5 minutes using a die for compression molding and a hot press. The measurement results of flexural strength, flexural elasticity, flexural strain at break and water absorbency when immersed for 24 hours of the specimen according to JISK6911-1995 and the evaluation results of appearance of the molded article according to the following evaluation criteria are shown in Table 3.

Evaluation of Appearance of Molded Article

◯: Surface is even and glossy.

Δ: Surface has colored patches or non-glossy areas.

×: The molded article has no gloss overall or has cracks.

COMPARATIVE EXAMPLES 3 and 4

A curable biomass resin mixture, a compound and a molded article were obtained in the same manner as in Examples 15 to 27, except that the biomass resin compositions obtained in Comparative Examples 1 and 2 were used instead of the biomass resins obtained in Examples 1 to 13. The measurement results of flowability of the obtained curable biomass resin composition are shown in Table 2 and the evaluation results of moldability of the compound and appearance, flexural strength and flexural elasticity of the molded article are shown in Table 3.

TABLE 2

| | Ex. | | | | | | | | |
|---|---|---|---|---|---|---|---|---|---|
| | 1 | 2 | 3 | 4 | 5 | 6 | 7 | 8 | 9 |
| Biomass | | | | | | | | | |
| Wood flour (parts by weight) | 100 | 100 | | 100 | 100 | 100 | 100 | 100 | 100 |
| Waste paper (parts by weight) | | | 100 | | | | | | |
| Phenol (parts by weight) | 297 | 247.5 | 294 | 297 | 297 | 297 | 297 | 297 | 297 |
| Sulfuric acid (parts by weight) | 3 | 2.5 | 6 | 3 | 3 | 3 | 3 | 3 | 3 |
| Formalin (parts by weight) | 0 | 0 | 0 | 0 | 0 | 0 | 0 | 0 | 0 |
| Reactive substance or precursor of reactive substance that is added | | | | | | | | | |
| Type | benzyl alcohol | benzyl alcohol | benzyl alcohol | benzyl alcohol | p-t-butylphenol | p-nonylphenol | wood oil | wood oil | linseed oil |
| Point of adding | before phenolization | before phenolization | before phenolization | after phenolization | before phenolization | after phenolization | during phenolization | during phenolization | during phenolization |
| Amount (parts by weight) | 20 | 25 | 20 | 20 | 35 | 35 | 100 | 50 | 50 |
| Melting point (° C.) | −15.3 | −15.3 | −15.3 | −15.3 | 90 | 2 | — | — | — |
| Biomass resin composition | | | | | | | | | |
| Yield (parts by weight) | 220 | 215 | 240 | 265 | 235 | 260 | 336 | 284 | 285 |
| Reactive substance present in resin composition | | | | | | | | | |
| Type | dimer such as benzyl phenol[1] | dimer such as benzyl phenol[1] | dimer such as benzyl phenol[1] | dimer such as benzyl phenol[1] | p-t-butylphenol | p-nonylphenol | wood oil/wood component/wood phenol reaction substance | wood oil/wood component/phenol reaction substance | linseed oil/wood component/phenol reaction substance |
| Theoretical amount present (parts by weight) | 16.7 | 21.4 | 15.3 | 14 | 14.9 | 13.5 | 100 | 50 | 50 |
| Melting point (° C.)[2] | 40 ~ 50 | 40 ~ 50 | 40 ~ 50 | 40 ~ 50 | 90 | 2 | — | — | — |
| Free phenols (%) | 0.2 | 0.1 | 0.5 | 1.2 | 0.6 | 0.5 | 0.8 | 0.9 | 1.1 |
| Residue (%) | 1.2 | 6.3 | 8.5 | 1.1 | 3.2 | 1.2 | 1.7 | 1.8 | 1.5 |
| Softening point (° C.) | 94.6 | 85 | 99 | 104.8 | 102 | 104.2 | 96.6 | 98.2 | 94.5 |
| Flowability (125° C., mm) | 43 | 55 | 32 | 27 | 30 | 28 | 45 | 42 | 46 |

| | Ex. | | | | Con. Ex. | |
|---|---|---|---|---|---|---|
| | 10 | 11 | 12 | 13 | 1 | 2 |
| Biomass | | | | | | |
| Wood flour (parts by weight) | 100 | 100 | 100 | 100 | 100 | |
| Waste paper (parts by weight) | | | | | | 100 |

TABLE 2-continued

| | | | | | |
|---|---|---|---|---|---|
| Phenol (parts by weight) | 297 | 297 | 297 | 297 | 294 |
| Sulfuric acid (parts by weight) | 3 | 3 | 3 | 3 | 6 |
| Formalin (parts by weight) | 0 | 0 | 89 | 0 | 0 |
| Reactive substance or precursor of reactive substance that is added | | | | | |
| Type | cashew oil | soyabean oil | benzyl alcohol & wood oil | benzyl alcohol | — |
| Point of adding | during phenolization | during phenolization | before (benzyl alcohol) and during (wood oil) phenolization | before phenolization | — |
| Amount (parts by weight) | 50 | 50 | 20 + 100 | 20 | — |
| Melting point (° C.) | — | — | — | -15.3 | — |
| Biomass resin composition | | | | | |
| Yield (parts by weight) | 285 | 283 | 331 | 300 | 220 |
| Reactive substance in resin composition | | | | | |
| Type | cashew oil/wood component/phenol reaction substance | soyabean oil/wood component/phenol reaction substance | dimer such as benzyl phenol & wood oil/wood component/phenol reaction substance | dimer such as benzyl phenol[1] | — |
| Theoretical amount present (parts by weight) | 50 | 50 | 116.7 | 12.2 | — |
| Melting point (° C.)[2] | — | — | — | 40 ~ 50 | — |
| Free phenols (%) | 1 | 0.8 | 0.5 | 0.1 | 2.1 |
| Residue (%) | 1.7 | 1.6 | 1.5 | 1.3 | 7.1 |
| Softening point (° C.) | 99.8 | 98 | 83 | 94 | 132.4 |
| Flowability (125° C., mm) | 33 | 40 | 55 | 42 | 0 |

[1]Mixture of 2-benzylphenol, 4-benzylphenol and benzyl phenol ether
[2]Melting point of mixture of 2-benzylphenol, 4-benzylphenol, 4-benzylphenol and benzyl phenol ether

TABLE 3

| | Ex. | | | | | | | |
|---|---|---|---|---|---|---|---|---|
| | 15 | 16 | 17 | 18 | 19 | 20 | 21 | 22 |
| Biomass resin composition that is used | prepared in Ex. 1 | prepared in Ex. 2 | prepared in Ex. 3 | prepared in Ex. 4 | prepared in Ex. 5 | prepared in Ex. 6 | prepared in Ex. 7 | prepared in Ex. 8 |
| Biomass resin composition (parts by weight) | 100 | 100 | 100 | 100 | 100 | 100 | 100 | 100 |
| Hexamethylenetetramine (parts by weight) | 15 | 15 | 15 | 15 | 15 | 15 | 15 | 15 |
| Calcium hydroxide (parts by weight) | 4 | 4 | 4 | 4 | 4 | 4 | 4 | 4 |
| Zinc stearate (parts by weight) | 2 | 2 | 2 | 2 | 2 | 2 | 2 | 2 |
| Wood flour (parts by weight) | 100 | 100 | 100 | 100 | 100 | 100 | 100 | 100 |
| Disc flowability (mm) | 88 | 96 | 83 | 82 | 84 | 85 | 92 | 88 |
| Appearance of molded article | ○ | ○ | ○ | ○ | ○ | ○ | ○ | ○ |
| Flexural strength (Mpa) | 96.3 | 93.5 | 97.2 | 92.8 | 95.5 | 94.6 | 97.4 | 93.4 |
| Flexural elasticity (Mpa) | 7220 | 7328 | 7430 | 7260 | 7180 | 7200 | 6268 | 6650 |
| Strain at break (%) | 1.18 | 1.29 | 1.16 | 1.22 | 1.3 | 1.31 | 1.86 | 1.52 |
| Water absorption in 24 hours (%) | 1.10 | 1.07 | 1.12 | 1.18 | 1.02 | 1.00 | 0.47 | 0.52 |

| | Ex. | | | | | Com. Ex. | |
|---|---|---|---|---|---|---|---|
| | 23 | 24 | 25 | 26 | 27 | 3 | 4 |
| Biomass resin composition that is used | prepared in Ex. 9 | prepared in Ex. 10 | prepared in Ex. 11 | prepared in Ex. 12 | prepared in Ex. 13 | prepared in Com. Ex. 1 | prepared in Com. Ex. 2 |
| Biomass resin composition (parts by weight) | 100 | 100 | 100 | 100 | 100 | 100 | 100 |
| Hexamethylenetetramine (parts by weight) | 15 | 15 | 15 | 15 | 15 | 15 | 15 |
| Calcium hydroxide (parts by weight) | 4 | 4 | 4 | 4 | 4 | 4 | 4 |
| Zinc stearate (parts by weight) | 2 | 2 | 2 | 2 | 2 | 2 | 2 |
| Wood flour (arts by weight) | 100 | 100 | 100 | 100 | 100 | 100 | 100 |
| Disc flowability (mm) | 89 | 84 | 82 | 95 | 89 | 52 | 47 |
| Appearance of molded article | ○ | ○ | ○ | ○ | ○ | Δ | Δ |
| Flexural strength (Mpa) | 88.9 | 93.1 | 92.7 | 96.6 | 98.4 | 73.5 | 69.7 |
| Flexural elasticity (Mpa) | 6874 | 6852 | 6768 | 6732 | 7428 | 7862 | 7438 |
| Strain at break (%) | 1.45 | 1.46 | 1.46 | 1.83 | 1.21 | 1.08 | 1.1 |
| Water absorption in 24 hours (%) | 0.50 | 0.43 | 0.54 | 0.48 | 0.72 | 1.42 | 1.55 |

EXAMPLES 28 to 29

Each of the components shown in Table 4 were mixed with the curable resin composition obtained in Example 15 as the binder in the compounding ratio shown in Table 4 using a mixer. Then, the mixture was heat pressure molded under pressure of 10 MPa at 180° C. for 15 minutes to obtain a molded article having a thickness of 15 mm. The molded article was cut out in a size of 20 mm×10 mm and the flexural strength was measured by the three-point flexural strength test (fulcrum distance 80 mm). The measurement results are shown in Table 4.

TABLE 4

| | Ex. 28 | Ex. 29 |
|---|---|---|
| Curable biomass resin composition that is used | prepared in Ex. 15 | prepared in Ex. 15 |
| Curable biomass resin composition (parts by weight) | 15 | 10 |
| Rock wool (parts by weight) | 20 | 0 |
| Calcium carbonate (parts by weight) | 65 | 30 |
| Silica (parts by weight) | 0 | 30 |
| Perlite (parts by weight) | 0 | 10 |
| Pulp (parts by weight) | 0 | 20 |

TABLE 4-continued

| | Ex. 28 | Ex. 29 |
|---|---|---|
| Flexural properties of molded article | | |
| Flexural strength (MPa) | 61.6 | 15.9 |
| Flexural elasticity (MPa) | 24832 | 1951 |

As indicated in Table 2, in Examples 1 to 3 wherein benzyl alcohol, which is a precursor of the reactive substance, was added, the softening point of the obtained resin composition was at most 100° C. Particularly in Example 2 wherein the amount of benzyl alcohol was 25 parts by weight, a resin composition having a softening point of 85° C. was obtained. The measurement results of flowability of the resin compositions obtained in Examples 1 to 3 were 43 mm, 55 mm and 32 mm respectively at 125° C.

In Example 4, benzyl alcohol was added after phenolization was finished. The softening point of the resin composition was 104.8° C. and was 10° C. higher than the softening point of the resin composition obtained in Example 1, wherein benzyl alcohol was added at the beginning of phenolization reaction of the biomass substance.

Examples 5 and 6 are systems wherein alkyl phenol was added as the reactive substance. In Example 5, the reactive substance was added before phenolization reaction and in Example 6, the reactive substance was added after phenolization reaction. The effect of lowering the softening point was somewhat lower than the systems of Examples 1 to 3 wherein benzyl alcohol was added, but the results were practical.

Examples 7 and 8 are systems wherein wood oil was added as the reactive substance. In Example 7, the same amount of wood oil as the wood flour was added but in Example 8, wood oil was added in an amount of 50% by weight of the wood flour. In both cases, the softening point was 100° C. or lower and flowability was favorable.

In Examples 9 to 11, linseed oil, cashew oil and soyabean oil were respectively used as the reactive substance instead of wood oil. In each case, the softening point was at most 100° C. and flowability was favorable.

Example 12 is an example of using benzyl alcohol and wood oil together. By using together, the softening point of the resin composition is lowered to 83° C. and flowability is excellent.

In Example 13, after phenolization reaction in the present of benzyl alcohol, formalin was subsequently added and part of the unreacted phenol was introduced into the biomass resin composition. As a result, the yield of the resin composition was increased 80 parts by weight in comparison to Example 1 and the softening point and flowability hardly differed from Example 1.

Example 14 is an example of preparation of liquid resol resin. The obtained resol had favorable stability, reactivity and viscosity.

On the other hand, the biomass resin compositions obtained by the conventional method without adding a reactive substance in Comparative Examples 1 and 2 had a high softening point of 126.3° C. and 132.4° C. respectively and flowability of 0.

As indicated in Table 3, the biomass molding compounds comprising the resin compositions obtained in Examples 1 to 13 and the molded articles comprising the compounds were found to have more favorable moldability and to be superior in appearance, strength and water resistance as a molded article, in comparison to the biomass molding compounds comprising the resin compositions obtained in Comparative Examples 1 and 2. Particularly, in Examples 21 to 26 wherein resin modified by drying oil was used, elastic modulus of the molded article was decreased more than when another additive was used and flexural strain at break was significantly improved. The water absorbency was approximately ⅓ of those in Comparative Examples and was 50% lower than in Examples 15 to 20. That is, by using drying oil, water resistance and flexibility of the resin molded article was improved significantly.

On the other hand, the molded article of Comparative Examples 3 and 4 were poor in moldability and not only was the strength low, but also the surface of the corners of the molded article lacked gloss.

Also, as indicated by Table 4, the biomass resin composition of the present invention was found to have excellent properties as a binder.

The biomass resin composition of the present invention has a low melting point and favorable flowability and moldability. Also, the molding material and the molded article obtained therefrom are excellent in various properties such as strength, flexibility and water resistance. The biomass resin composition of the present invention can also be used as a curable resin and a molding material of thermosetting resin. Also, according to the preparation process of the present invention, the biomass resin composition can be prepared easily.

What is claimed is:

1. A biomass resin composition comprising a phenolized biomass substance and a reactive substance having a melting point of at most 100° C. and selected from the group consisting of butylphenol, octylphenol, nonylphenol, benzylphenol and benzyl phenyl ether.

2. The biomass resin composition of claim 1, which comprises a product obtained by reacting a biomass substance, phenol and the reactive substance having a melting point of at most 100° C., in the presence of an acid catalyst.

3. The biomass resin composition of claim 1, wherein the amount of said reactive substance is 3 to 50% by weight based on the total biomass resin composition.

4. The biomass resin composition of claim 1, wherein said biomass substance is a lignocellulose substance.

5. A process for preparing a biomass resin composition comprises comprising a phenolized biomass substance and a reactive substance having a melting point of at most 100° C. and selected from the group consisting of butylphenol, octylphenol, nonylphenol, benzylphenol and benzyl phenyl ether, the process comprising adding the reactive substance or a precursor of the reactive substance to a reaction system, in a step of preparing the phenolized biomass substance by phenolizing a biomass substance with a phenol in the presence of an acid catalyst.

6. The process for preparing a biomass resin composition of claim 5, wherein the amount of said reactive substance is 3 to 50% by weight based on the total biomass resin composition.

7. The process for preparing a biomass resin composition of claim 5, wherein after reacting the biomass substance, the reactive substance and the phenol in the presence of an acid catalyst, reaction is conducted with an aldehyde or an aldehyde derivative.

* * * * *